United States Patent
Gupta

(10) Patent No.: US 10,237,846 B2
(45) Date of Patent: Mar. 19, 2019

(54) WIRELESS LOCAL AREA NETWORK (WLAN) SELECTION RULES

(71) Applicant: Intel IP Corporation, Santa Clara, CA (US)

(72) Inventor: Vivek Gupta, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/779,228

(22) PCT Filed: Mar. 11, 2014

(86) PCT No.: PCT/US2014/023022
§ 371 (c)(1),
(2) Date: Sep. 22, 2015

(87) PCT Pub. No.: WO2014/175967
PCT Pub. Date: Oct. 30, 2014

(65) Prior Publication Data
US 2016/0050619 A1    Feb. 18, 2016

Related U.S. Application Data

(60) Provisional application No. 61/816,662, filed on Apr. 26, 2013.

(51) Int. Cl.
*H04W 68/02* (2009.01)
*H04N 7/14* (2006.01)
(Continued)

(52) U.S. Cl.
CPC ........... *H04W 68/02* (2013.01); *H04J 11/00* (2013.01); *H04J 11/005* (2013.01);
(Continued)

(58) Field of Classification Search
CPC ..... H04W 48/18; H04W 48/00; H04W 48/16; H04W 48/20; H04W 72/00; H04W 72/02;
(Continued)

(56) References Cited

U.S. PATENT DOCUMENTS 6,799,038 B2 *   9/2004   Gopikanth ............ H04W 48/18
                                                              455/414.1
2005/0107109 A1 *  5/2005   Gunaratnam ......... H04W 48/18
                                                              455/525
(Continued)

FOREIGN PATENT DOCUMENTS

CN          1757249 A       4/2006
CN        101185360 A       5/2008
(Continued)

OTHER PUBLICATIONS

International Search Report and Written Opinion dated Jun. 27, 2014 from International Application No. PCT/US2014/023022.
(Continued)

*Primary Examiner* — Warner Wong
(74) *Attorney, Agent, or Firm* — Schwabe, Williamson & Wyatt, P.C.

(57) ABSTRACT

In embodiments, apparatuses, methods, and storage media may be described for identifying a wireless local area network (WLAN) selection preference rule for use by a user equipment (UE) during a re-association procedure of the UE. The UE may use the WLAN selection preference rule to identify a WLAN with which the UE should associate.

11 Claims, 6 Drawing Sheets

(51) Int. Cl.

| | | |
|---|---|---|
| *H04W 76/14* | (2018.01) | |
| *H04W 4/70* | (2018.01) | |
| *H04W 76/27* | (2018.01) | |
| *H04W 76/28* | (2018.01) | |
| *H04W 28/02* | (2009.01) | |
| *H04W 72/04* | (2009.01) | |
| *H04W 52/02* | (2009.01) | |
| *H04W 8/00* | (2009.01) | |
| *H04L 5/00* | (2006.01) | |
| *H04W 88/02* | (2009.01) | |
| *H04W 36/00* | (2009.01) | |
| *H04W 60/00* | (2009.01) | |
| *H04L 29/06* | (2006.01) | |
| *H04W 8/22* | (2009.01) | |
| *H04J 11/00* | (2006.01) | |
| *H04W 24/06* | (2009.01) | |
| *H04W 72/12* | (2009.01) | |
| *H04W 48/18* | (2009.01) | |
| *H04L 12/14* | (2006.01) | |
| *H04L 29/08* | (2006.01) | |
| *H04L 1/18* | (2006.01) | |
| *H04W 52/32* | (2009.01) | |
| *H04N 7/15* | (2006.01) | |
| *H04W 68/00* | (2009.01) | |
| *H04L 12/26* | (2006.01) | |
| *H04L 1/16* | (2006.01) | |
| *H04W 52/08* | (2009.01) | |
| *H04L 12/801* | (2013.01) | |
| *H04W 48/06* | (2009.01) | |
| *H04W 76/18* | (2018.01) | |
| *H04W 76/38* | (2018.01) | |
| *H04W 88/06* | (2009.01) | |
| *H04N 21/4728* | (2011.01) | |
| *H04N 21/4788* | (2011.01) | |
| *H04N 21/6437* | (2011.01) | |
| *H04W 52/14* | (2009.01) | |
| *H04W 52/24* | (2009.01) | |

(52) U.S. Cl.
CPC ........ *H04J 11/0023* (2013.01); *H04L 1/1671* (2013.01); *H04L 1/1812* (2013.01); *H04L 5/005* (2013.01); *H04L 5/0007* (2013.01); *H04L 5/0032* (2013.01); *H04L 5/0033* (2013.01); *H04L 5/0073* (2013.01); *H04L 12/1407* (2013.01); *H04L 29/06068* (2013.01); *H04L 43/16* (2013.01); *H04L 47/12* (2013.01); *H04L 65/105* (2013.01); *H04L 65/1006* (2013.01); *H04L 65/1016* (2013.01); *H04L 65/1069* (2013.01); *H04L 65/1073* (2013.01); *H04L 65/602* (2013.01); *H04L 65/608* (2013.01); *H04L 65/80* (2013.01); *H04L 67/02* (2013.01); *H04L 67/10* (2013.01); *H04N 7/141* (2013.01); *H04N 7/147* (2013.01); *H04N 7/15* (2013.01); *H04W 4/70* (2018.02); *H04W 8/005* (2013.01); *H04W 8/22* (2013.01); *H04W 24/06* (2013.01); *H04W 28/0236* (2013.01); *H04W 28/0289* (2013.01); *H04W 36/0066* (2013.01); *H04W 48/18* (2013.01); *H04W 52/0212* (2013.01); *H04W 52/0216* (2013.01); *H04W 52/08* (2013.01); *H04W 52/32* (2013.01); *H04W 60/00* (2013.01); *H04W 68/00* (2013.01); *H04W 72/0446* (2013.01); *H04W 72/0486* (2013.01); *H04W 72/1231* (2013.01); *H04W 72/1278* (2013.01); *H04W 76/14* (2018.02); *H04W 76/27* (2018.02); *H04W 76/28* (2018.02); *H04W 88/02* (2013.01); *H04L 1/1861* (2013.01); *H04L 5/0044* (2013.01); *H04L 5/0055* (2013.01); *H04L 47/10* (2013.01); *H04N 21/4728* (2013.01); *H04N 21/4788* (2013.01); *H04N 21/6437* (2013.01); *H04W 48/06* (2013.01); *H04W 52/146* (2013.01); *H04W 52/242* (2013.01); *H04W 52/325* (2013.01); *H04W 76/18* (2018.02); *H04W 76/38* (2018.02); *H04W 88/06* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/23* (2018.01); *Y02D 70/24* (2018.01); *Y02D 70/26* (2018.01)

(58) Field of Classification Search
CPC .... H04W 72/048; H04W 8/18; H04L 12/5692
See application file for complete search history.

(56) References Cited

U.S. PATENT DOCUMENTS

| | | | |
|---|---|---|---|
| 2007/0190974 A1 | 8/2007 | Zhang | |
| 2007/0254646 A1* | 11/2007 | Sokondar | H04W 8/183 455/432.1 |
| 2008/0220773 A1* | 9/2008 | Buckley | H04W 48/18 455/433 |
| 2010/0054222 A1 | 3/2010 | Rune | |
| 2011/0124335 A1* | 5/2011 | Martin | G01S 5/0205 455/434 |
| 2012/0093031 A1* | 4/2012 | Wang | H04L 29/06 370/254 |
| 2012/0309447 A1 | 12/2012 | Mustajarvi et al. | |
| 2012/0316699 A1* | 12/2012 | Filev | B60W 50/085 701/1 |
| 2013/0034019 A1* | 2/2013 | Mustajarvi | H04W 48/16 370/254 |
| 2013/0035095 A1* | 2/2013 | Wang | H04W 4/14 455/433 |
| 2013/0078985 A1* | 3/2013 | Savolainen | H04L 29/12952 455/418 |
| 2014/0064094 A1* | 3/2014 | Shaikh | H04L 41/0893 370/236 |
| 2014/0071854 A1* | 3/2014 | Xiang | H04W 48/16 370/254 |
| 2014/0200000 A1* | 7/2014 | Jin | H04W 48/18 455/435.2 |
| 2014/0204929 A1* | 7/2014 | Cho | H04W 8/02 370/338 |
| 2014/0241333 A1* | 8/2014 | Kim | H04W 48/16 370/338 |
| 2014/0287746 A1* | 9/2014 | Faccin | H04W 48/18 455/433 |
| 2014/0295913 A1* | 10/2014 | Gupta | H04W 74/02 455/552.1 |
| 2014/0341076 A1* | 11/2014 | Orlandi | H04W 48/18 370/254 |
| 2015/0023341 A1* | 1/2015 | Zhao | H04W 48/18 370/338 |
| 2015/0119028 A1* | 4/2015 | Zhang | H04W 48/18 455/434 |
| 2015/0334644 A1* | 11/2015 | Kim | H04W 48/18 370/329 |

(56) References Cited

U.S. PATENT DOCUMENTS

| | | | | |
|---|---|---|---|---|
| 2015/0351021 | A1* | 12/2015 | Zhang | H04W 48/18 |
| | | | | 455/432.1 |
| 2016/0044570 | A1* | 2/2016 | Jeong | H04L 47/125 |
| | | | | 370/338 |

FOREIGN PATENT DOCUMENTS

| | | |
|---|---|---|
| CN | 01312421 A | 11/2008 |
| CN | 101345981 A | 1/2009 |
| WO | 2011082833 A1 | 7/2011 |
| WO | 2012/092935 A1 | 7/2012 |

OTHER PUBLICATIONS

3GPP, "Technical Specification Group Services and System Aspects; Architecture enhancements for non-3GPP accesses (Release 12)," 3GPP TS 23.402 V12.3.0 (Dec. 2013), Lte Advanced, 288 pages.

Catt et al., "Definition of List of VPLMNs with preferred WLAN Selection Rules to ANDSF MO," 3GPP TSG-CT WG1 Meeting #86 C1-140708 (was C1-140630), Version 12.3.0, Jan. 20-24, 2014, Guangzhou, P.R of China, 137 pages.

Intel et al., "Resolution of FFS in Solution #3 after recovery from WLAN signal loss," SA WG2 Meeting #96 S2-131486, Agenda Item: 7.7.1, 08—Apr. 12, 2013, San Diego, California, USA, 4 pages.

Motorla Mobility et al., "UE procedures based on ANDSF information," SA WG2 Meeting #100, S2-134302, Version 12.2.0, Nov. 11-15, 2013, San Francisco, USA, 8 pages.

Extended European Search Report dated Jan. 16, 2017 from European Patent Application No. 14788832.5, 13 pages.

Research in Motion UK Limited, "WLAN Network Selection," 3GPP TSG-RAN WG2 Meeting #81bis, R2-131362, Agenda Item: 5.1, Apr. 15-19, 2013, Chicago, USA, 4 pages.

3GPP, "Technical Specification Group Core Network and Terminals; Access to the 3GPP Evolved Packet Core (EPC) via non-3GPP access networks; Stage 3 (Release 12)," 3GPP TS 24.302 V12.0.0 (Mar. 2013); Mar. 4, 2013, Lte Advanced, 61 pages.

3GPP, "Technical Specification Group Services and System Aspects; Architecture enhancements for non-3GPP accesses (Release 12)," 3GPP TS 23.402 V12.0.0 (Mar. 2013), Feb. 12, 2013, Lte Advanced, 253 pages.

3GPP, "Technical Specification Group Services and System Aspects; WLAN Network Selection for 3GPP Terminals; Stage 2 (Release 12)," 3GPP TR 23.865 V0.6.0 (Apr. 2013), Apr. 24, 2013, Lte, 33 pages.

3GPP, "Technical Specification Group Core Network and Terminals; 3GPP System to Wireless Local Area Network (WLAN) interworking; WLAN User Equipment (WLAN UE) to network protocols; Stage 3 (Release 11)," 3GPP TS 24.234 V11.3.0 (Jun. 2012), Mar. 15, 2013, Lte Advanced, 41 pages.

3GPP, "Technical Specification Group Core Network and Terminals; Access Network Discovery and Selection Function (ANDSF) Management Object (MO) (Release 12)," 3GPP TS 24.312 V12.0.0 (Mar. 2013), Jun. 27, 2012, Lte Advanced, 173 pages.

European Patent Office—Article 94(3) dated May 18, 2018 from European Patent Application No. 14788832.5, 6 pages.

* cited by examiner

WIRELESS LOCAL AREA NETWORK (WLAN) SELECTION RULES

CROSS REFERENCE TO RELATED APPLICATIONS

The present application is a national phase entry under 35 U.S.C. § 371 of International Application No. PCT/US2014/023022, filed Mar. 11, 2014, entitled "WIRELESS LOCAL AREA NETWORK (WLAN) SELECTION RULES", which claims priority to U.S. Provisional Patent Application No. 61/816,662, filed Apr. 26, 2013, entitled "Advanced Wireless Communication Systems and Techniques," the entire disclosures of which are hereby incorporated by reference in their entireties.

FIELD

Embodiments of the present invention relate generally to the technical field of wireless local area network (WLAN) selection.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In some cases, it may be desirable for a user equipment (UE) of a third generation partnership project (3GPP) network to connect to a WLAN. In some cases, an entity of the 3GPP network may supply one or more WLAN selection rules to the UE, and the UE may use the WLAN selection rules to select a WLAN with which it may associate or connect. However, in some cases, for example during a signal re-association procedure such as a power-up procedure or loss-of-signal recovery procedure, the UE may not be connected to a 3GPP network. Therefore the entity of the 3GPP network may not be able to provide a WLAN selection rule to the UE during the re-association procedure.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Apparatuses, methods, and storage media are described herein for identifying a WLAN selection preference rule to be used by a UE during a re-association procedure such as a loss-of-signal recovery procedure or a power-up procedure. In embodiments, the WLAN selection preference rule may be pre-provisioned by a home PLMN (HPLMN) of the UE.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments a module may be a distinct circuit, while in other embodiments a module may include a plurality of circuits.

Figure 1:
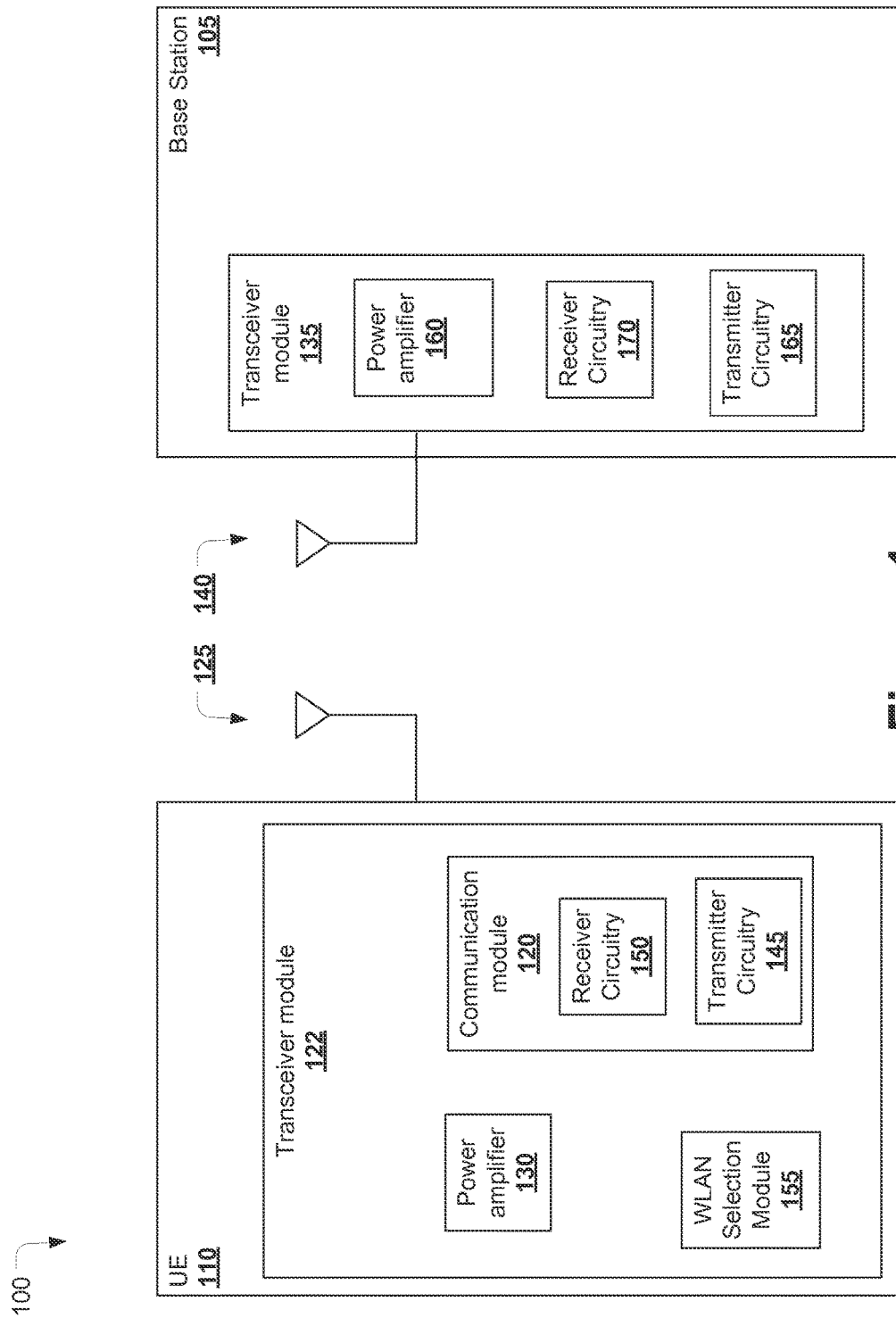
FIG. 1 schematically illustrates a high-level example of a network comprising a UE and a base station, in accordance with various embodiments.

FIG. 1 schematically illustrates a wireless communication network 100 (hereinafter "network 100") in accordance with various embodiments. The network 100 may include a UE 110 communicatively coupled with an access node 105. In some embodiments, the network 100 may be an access network of a 3GPP long term evolution (LTE) network such as evolved universal terrestrial radio access network (E-UTRAN). In these embodiments the access node 105 may be an eNodeB (eNB, also referred to as an evolved NodeB) configured to wirelessly communicate with the UE 110 using a wireless protocol such as the 3GPP LTE wireless protocol. In other embodiments, the network 100 may be a WLAN such as a WiFi network described by one or more of the Institute of Electrical and Electronics Engineers (IEEE) 802.11 standards and the access node 105 may be a WiFi Access Point (AP). In some embodiments the network 100 may include both a WiFi AP and an LTE eNB in communication with the UE 110.

As shown in FIG. 1, the UE 110 may include a transceiver module 122, which may also be referred to as a multi-mode transceiver chip. The transceiver module 122 may be configured to transmit and receive signals using one or more protocols such as LTE and/or WiFi. Specifically, the transceiver module 122 may be coupled with one or more of a plurality of antennas 125 of the UE 110 for communicating wirelessly with other components of the network 100, e.g., access node 105 or another UE. The antennas 125 may be powered by a power amplifier 130 which may be a component of the transceiver module 122 as shown in FIG. 1, or coupled with the transceiver module 122. In one embodiment, the power amplifier 130 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 122 may include a communication module 120, which may be referred to as a broadband module, which may contain both transmitter circuitry 145 configured to cause the antennas 125 to transmit one or more signals from the UE 110, and receiver circuitry 150 configured to process signals received by the antennas 125. In other embodiments, the communication module 120 may be implemented in separate chips or modules, for example one chip including the receiver circuitry 150 and another chip including the transmitter circuitry 145. In some embodiments, the transmitted or received signals may be WLAN signals transmitted to or received from a WLAN AP. In other embodiments the signals may be cellular signals transmitted to or received from a 3GPP eNB. In some embodiments, the transceiver module 122 may include or be coupled with a WLAN selection module 155 to select a WLAN from one or more available WLANs, as described below.

Similar to the UE 110, the access node 105 may include a transceiver module 135. The transceiver module 135 may be further coupled with one or more of a plurality of antennas 140 of the access node 105 for communicating wirelessly with other components of the network 100, e.g., UE 110. The antennas 140 may be powered by a power amplifier 160 which may be a component of the transceiver module 135, as shown in FIG. 1, or may be a separate component of the access node 105. In one embodiment, the power amplifier 160 may provide the power for all transmissions on the antennas 140. In other embodiments, there may be multiple power amplifiers on the access node 105. The use of multiple antennas 140 may allow for the access node 105 to use transmit diversity techniques such as SORTD, MIMO, or FD-MIMO. In certain embodiments the transceiver module 135 may contain both transmitter circuitry 165 configured to cause the antennas 140 to transmit one or more signals from the access node 105, and receiver circuitry 170 to process signals received by the antennas 140. In other embodiments, the transceiver module 135 may be replaced by transmitter circuitry 165 and receiver circuitry 170 which are separate from one another (not shown). In some embodiments, though not shown, the transceiver module 135 may include a communication module such as communication module 120 that includes the receiver circuitry 170 and the transmitter circuitry 165.

Figure 2:
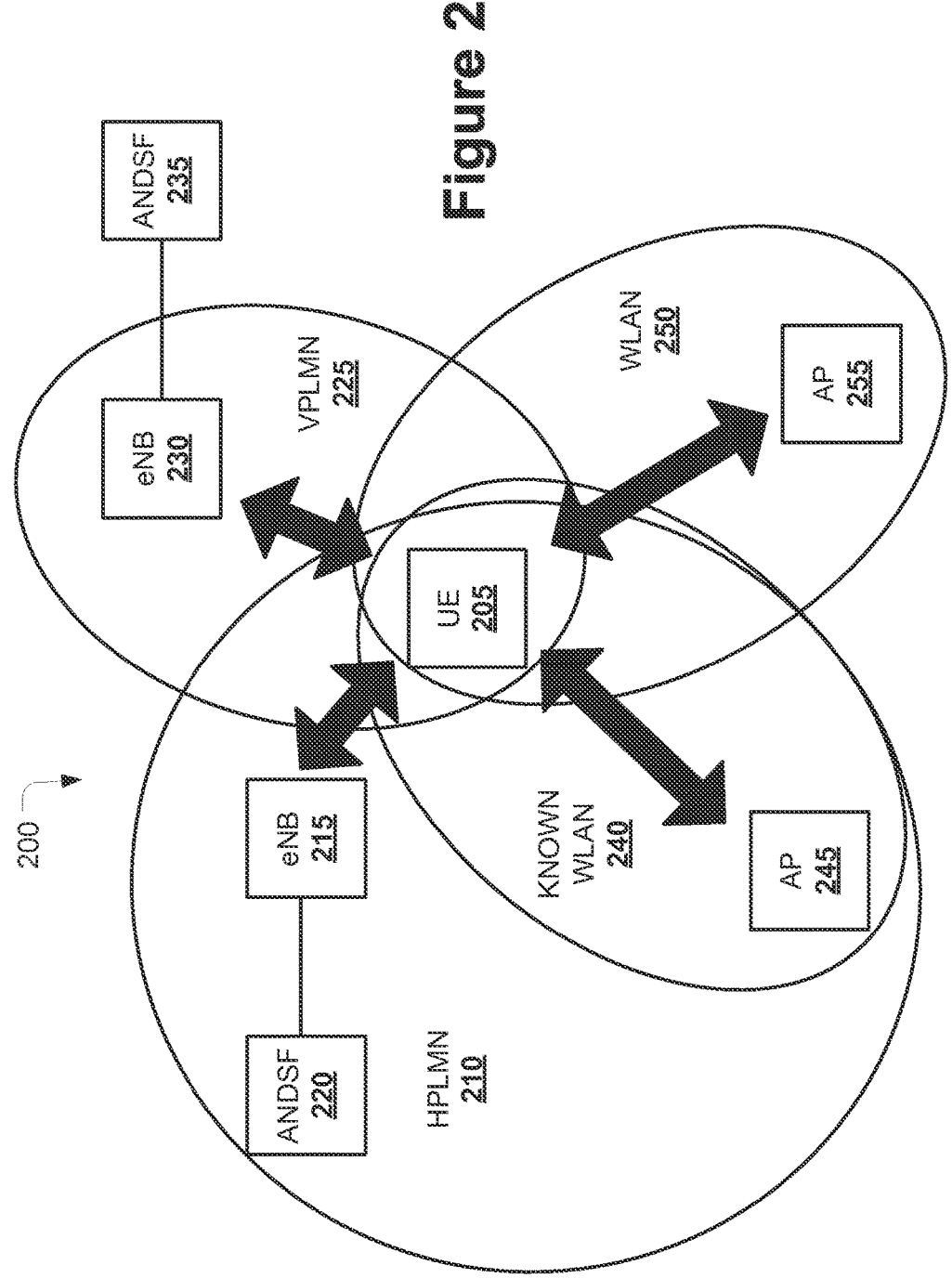
FIG. 2 schematically illustrates a high-level example of a network comprising a UE, a plurality of public land mobile networks (PLMNs), and a plurality of WLANs, in accordance with various embodiments.

FIG. 2 depicts a high-level example of a wireless network 200 that may include one or more 3GPP networks and WLAN networks. The coverage areas of the respective 3GPP networks and WLAN networks may be indicated by the generally circular elements in FIG. 2.

The network 200 may include a UE 205, which may be similar to the UE 110 of FIG. 1. The UE 205 may be within a coverage area of one or more 3GPP networks and WLAN networks. Specifically, the UE 205 may be in a coverage area of a HPLMN 210, which may be a 3GPP network as described above. The HPLMN 210 may include an eNB 215, which may be similar to the eNB and access node 105 described above with respect to FIG. 1. The eNB 215 may be coupled with an access network discovery and selection function (ANDSF) 220 of the HPLMN 210. The ANDSF 220 may be configured to supply one or more WLAN selection preference rules to the UE 205. For example, the ANDSF 220 may be configured to supply one or more WLAN selection preference rules such as an inter-system mobility policy (ISMP) rule, an inter-system routing policy (ISRP) rule, or a WLAN selection policy (WLANSP) rule to the UE 205. In some embodiments, the ISMP rule, the ISRP rule, or the WLANSP rule may be supplied to the UE 205 when the UE 205 is initially coupled with the HPLMN 210, and then the UE 205 may store the supplied rules in a storage of the UE 205 such as a subscriber identity module (SIM), a universal SIM (USIM), a non-volatile storage of the UE 205, or some other storage of the UE 205. As discussed herein, the supplied WLAN selection preference rule may be described as a pre-provisioned HPLMN WLAN selection preference rule.

In some cases the UE 205 may also be within a coverage area of another 3GPP network such as a visited public land mobile network (VPLMN) 225. Similar to the HPLMN 210, the VPLMN 225 may include an eNB 230 coupled with an ANDSF 235. Similar to the ANDSF 220, ANDSF 235 may be configured to supply one or more WLAN selection preference rules to the UE 205 such as an ISMP rule, an ISRP rule, and a WLANSP rule to the UE 205. As shown in FIG. 2, in some cases the ANDSF may be within the coverage area of a PLMN, for example ANDSF 220 within the coverage area of HPLMN 210. In other embodiments, the ANDSF may be outside of the coverage area of a PLMN, for example ANDSF 235 and VPLMN 225.

In embodiments, the HPLMN 210 may be a home network of the UE 205. Specifically, the user of the UE 205 may have an agreement or contract with the operator of the HPLMN 210. Therefore, the UE 205 may be configured to automatically connect to the eNB 215 of the HPLMN 210 if the eNB 215 is available. By contrast, the VPLMN 225 may be a roaming network of the UE 205. Specifically, the VPLMN 225 may be operated by a different mobile operator than the mobile operator of the HPLMN 210. If the HPLMN 210 is unavailable, then the UE 205 may be configured to connect to the eNB 230 of the VPLMN 225. In some embodiments the mobile operator of the HPLMN 210 may have a contract with the mobile operator of the VPLMN 225. In some embodiments the mobile operator of the HPLMN 210 may be the same entity as the mobile operator of the VPLMN 225. Although the coverage areas of the HPLMN 210 and the VPLMN 225 are shown as at least partially overlapping, in some embodiments the coverage areas of the HPLMN 210 and the VPLMN 225 may not overlap.

Although only a single VPLMN 225 is shown in FIG. 2, in some embodiments the network 200 may include a plurality of VPLMNs.

In addition to the HPLMN 210 and the VPLMN 225, the UE 205 may be within the coverage area of one or more WLANs such as an IEEE 802.11 WiFi network as described above. Specifically, the UE 205 may be within the coverage area of a known WLAN 240, and configured to couple with an AP 245 of the known WLAN 240 which may be similar to the AP and access node 105 described above with respect to FIG. 1. The known WLAN 240 may be, for example, a WLAN operated by the user of the UE 205 such as a WLAN of the user's home or office. Alternatively, the known WLAN 240 may be a WLAN of a business or other location with which the user of the UE 205 has selected to connect or otherwise indicated as a preferred WLAN of the user of the UE 205.

The network 200 may also include an additional WLAN 250 with an additional AP 255 that may be similar to the AP and access node on 105 of FIG. 1. In some embodiments, the WLAN 250 may not be known to the UE 205, but may be discovered during a discovery process of the UE 205. The WLAN 250 may be, for example, a WLAN of a neighbor of the user of the UE 205, or a WLAN operated by a mobile operator with whom the user of the UE 205 does not have a contract or pre-existing relationship. As shown in FIG. 2, the coverage areas of the known WLAN 240 and the WLAN 250 may overlap one another, and in some cases may overlap the coverage areas of one or both of the HPLMN 210 and the VPLMN 225. For example, the coverage area of the HPLMN 210 may completely overlap the coverage area of the known WLAN 240. In other embodiments the coverage areas of one or more of the HPLMN 210, VPLMN 225, known WLAN 240, and WLAN 250 may not overlap one another.

In some embodiments, the UE 205 may receive one or more WLAN selection preference rules from a PLMN such as the HPLMN 210 or the VPLMN 225. Specifically, the UE 205 may receive a WLAN selection preference rule from the ANDSFs 220 or 235 of the HPLMN 210 or the VPLMN 225. The WLAN selection preference rule may be one or more of a WLANSP rule, an ISMP rule, and/or an ISRP rule. While the UE 205 is connected to a PLMN, the WLAN selection preference rule of the PLMN may be considered an "active" rule. That is, the UE 205 may be configured to apply the WLAN selection preference rule of that PLMN to select a WLAN with which the UE 205 should connect. In some embodiments, as noted above, the UE 205 may be pre-provisioned with a WLAN selection preference rule by the HPLMN 210 and the WLAN selection preference rule may be stored by the UE 205 such as in a SIM, USIM, or a non-volatile storage of the UE 205.

Subsequent to this provisioning of the WLAN selection preference rule by the HPLMN 210, the UE 205 may enter a situation where the UE 205 may not be registered to any PLMN or WLAN. The UE 205 may then initiate a signal re-association procedure. For example, the UE 205 may be turned off and then turned back on again, which may cause the UE 205 to enter a signal re-association procedure such as a power-up procedure. During the power-up procedure, the UE 205 may not be registered to a PLMN or a WLAN, and therefore the UE 205 may have no active WLAN selection preference rule such as an active WLANSP rule, an active ISMP rule, or an active ISRP rule.

Alternatively, the UE 205 may not have been turned off, but may have otherwise lost connection with available WLANs or PLMNs. For example, the user of the UE 205 may have walked into an elevator or parking garage, or entered some other situation where a PLMN and WLAN signal is unavailable. In this case, the UE 205 may enter a signal re-association procedure such as a loss-of-signal recovery procedure to attempt to reconnect to a PLMN and/or a WLAN, however the UE 205 may not have an active WLAN selection preference rule such as an active WLANSP rule, an active ISMP rule, or an active ISRP rule.

As a solution to the situations described above where a WLAN selection preference rule may not be considered active during a power-up procedure or a loss-of-signal recovery procedure, a UE 205 may in some embodiments consider one or more of the pre-provisioned HPLMN WLAN selection preference rules received from the HPLMN 210 as active during the power-up procedure or the loss-of-signal recovery procedure before the UE 205 has connected to a PLMN or WLAN. For example, in some embodiments one or more of the pre-provisioned HPLMN WLAN selection preference rules received from the HPLMN 210 such as a WLANSP rule, an ISMP rule, or an ISRP rule may be considered by the UE 205 to be an active rule during the power-up procedure or the loss-of-signal recovery procedure, as described in further detail below.

Figure 3:
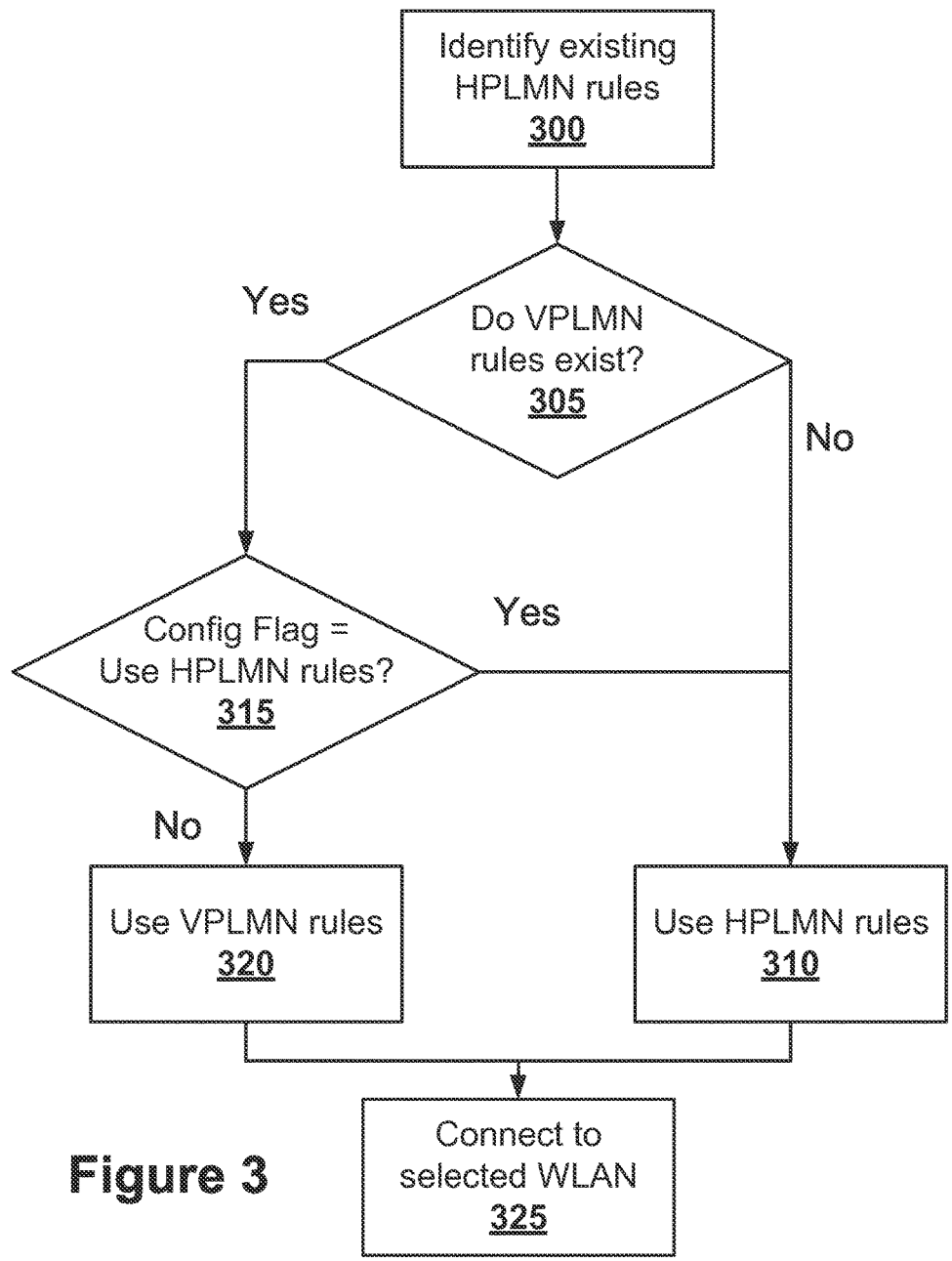
FIG. 3 depicts a process that may be performed by a UE during a power-up procedure, in accordance with various embodiments.

FIG. 3 depicts an example process that may be used by a UE such as UE 205 during a power-up procedure of the UE. Initially, the UE 205 may identify whether the UE 205 has been pre-provisioned with one or more HPLMN WLAN selection preference rules at 300 by the HPLMN 210 as discussed above. As noted above, the WLAN selection preference rules may be stored in a storage of the UE 205 such as a non-volatile memory, a SIM, a USIM, or some other storage of the UE. The WLAN selection preference rules may be, for example, a WLANSP rule, an ISMP rule, and/or an ISRP rule.

The UE 205 may then identify whether the UE 205 has received one or more WLAN selection preference rules from a VPLMN such as VPLMN 225 at 305. For example, during the power-up procedure the UE 205 may connect to the VPLMN 225, and specifically the eNB 230 of the VPLMN 225. After connecting to the VPLMN 225, the UE 205 may receive one or more WLAN selection preference rules from the VPLMN 225, and specifically the ANDSF 235 of the VPLMN 225. The WLAN selection preference rules may be, for example, a WLANSP rule, an ISMP rule, and/or an ISRP rule.

If the UE 205 has not received one or more WLAN selection preference rules from the VPLMN 225, the UE 205 may use one or more of the pre-provisioned HPLMN WLAN selection preference rules that were received from the HPLMN 210 at 310. For example, the UE 205 may not have connected with a PLMN such as the HPLMN 210 or the VPLMN 225. Therefore, the UE 205 may not have received a WLAN selection preference rule from the HPLMN 210 or the VPLMN 225 during the power-up procedure. Therefore, the UE 205 may default to the pre-provisioned HPLMN WLAN selection preference rule identified at 300.

In some embodiments, if the UE 205 has connected to a VPLMN such as VPLMN 225 and received one or more WLAN selection preference rules from the VPLMN 225, the UE 205 may check a configuration flag at 315 to identify whether the UE 205 is configured to use the pre-provisioned HPLMN WLAN selection preference rules identified at 300 or the WLAN selection preference rules received from the VPLMN 225. In some embodiments, the configuration flag may be based on a user setting, a setting of the manufacturer of the UE 205, an indication received by the UE 205 from the HPLMN 210, an indication received by the UE 205 from the VPLMN 225, an indication received by the UE 205 from one or more WLANs, or some other setting.

If the configuration flag indicates that the UE 205 is configured to use the pre-provisioned HPLMN WLAN selection preference rules identified at 300, then the UE 205 may use the pre-provisioned HPLMN WLAN selection preference rules at 310 to select a WLAN with which the UE 205 should connect. If the configuration flag indicates that the UE 205 is configured to not use the pre-provisioned HPLMN WLAN selection preference rules identified at 300, then the UE 205 may use one or more of the WLAN selection preference rules received from the VPLMN 225 at 320 to select a WLAN with which the UE 205 should connect. The UE 205 may then connect to the selected WLAN at 325. For example, the UE 205 may connect to the known WLAN 240 or the WLAN 250 based on the used WLAN selection preference rules.

Figure 4:
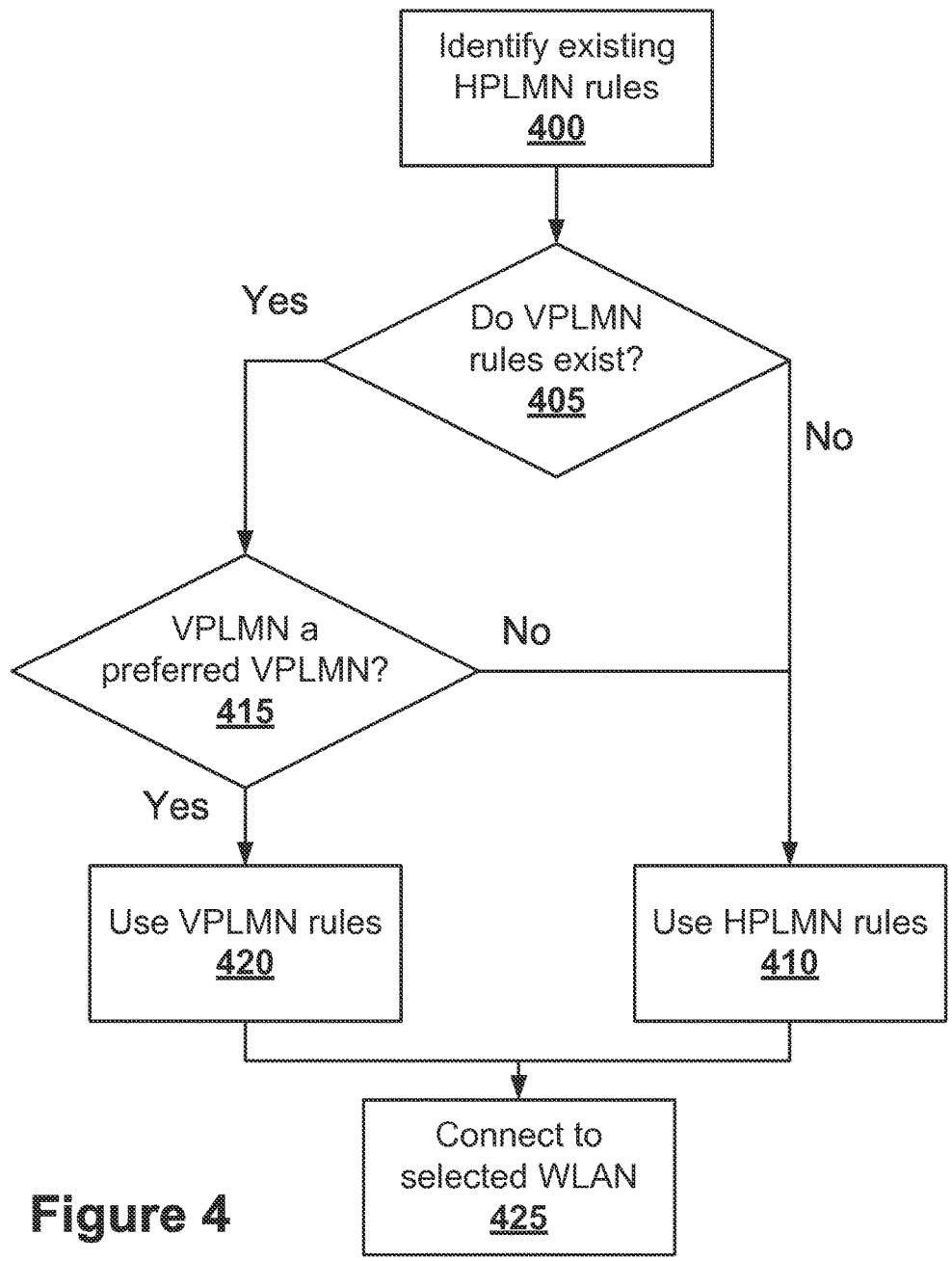
FIG. 4 depicts an alternative example of a process that may be performed by a UE during a power-up procedure, in accordance with various embodiments.

FIG. 4 depicts an alternative process that may be used by a UE 205 during a power-up procedure of the UE 205. Initially, the UE 205 may identify whether the UE 205 has been pre-provisioned with one or more WLAN selection preference rules by an HPLMN 210 at 400. Specifically, the identification at 400 may be similar to the identification 300 described above. Next, the UE 205 may identify whether the UE 205 has received one or more WLAN selection preference rules from a VPLMN 225 at 405. Specifically, the identification at 405 may be similar to the identification at 305 described above. As described above with respect to element 310, if the UE 205 has not received one or more WLAN selection preference rules from a VPLMN 225, then the UE 205 may use one or more of the pre-provisioned HPLMN WLAN selection preference rules at 410 to select a WLAN with which the UE 205 should connect.

If the UE 205 has received one or more WLAN selection preference rules from a VPLMN 225, the UE 205 may then identify whether the VPLMN 225 is a preferred VPLMN at 415. For example, the UE 205 may analyze a list or table of preferred VPLMNs to identify whether the VPLMN 225 is a preferred VPLMN. In some embodiments, the list of preferred VPLMNs may be based on an indication by the HPLMN 210, a user setting, a previous connection history with the VPLMN, or some other criteria.

If the VPLMN 225 is identified as a preferred VPLMN at 415, then the UE 205 may be configured to use the one or more WLAN selection preference rules received from the VPLMN to select a WLAN with which the UE 205 should connect at 205. If the VPLMN 225 is not identified as a preferred VPLMN at 415, then the UE 205 may be configured to use the one or more pre-provisioned HPLMN WLAN selection preference rules at 410 to select a WLAN with which the UE 205 should connect. The UE 205 may then connect to the selected WLAN at 425. For example, the UE 205 may connect to the known WLAN 240 or the WLAN 250 based on the used WLAN selection preference rules.

Although two different power-up procedures are described above that may use different configuration flags or settings to select between one or more pre-provisioned HPLMN WLAN selection preference rules and one or more WLAN selection preference rules received from a VPLMN 420, the embodiments described above are merely examples of using such configuration flags or settings. In other embodiments, additional or alternative flags may be used with or instead of the flags or settings described above.

Figure 5:
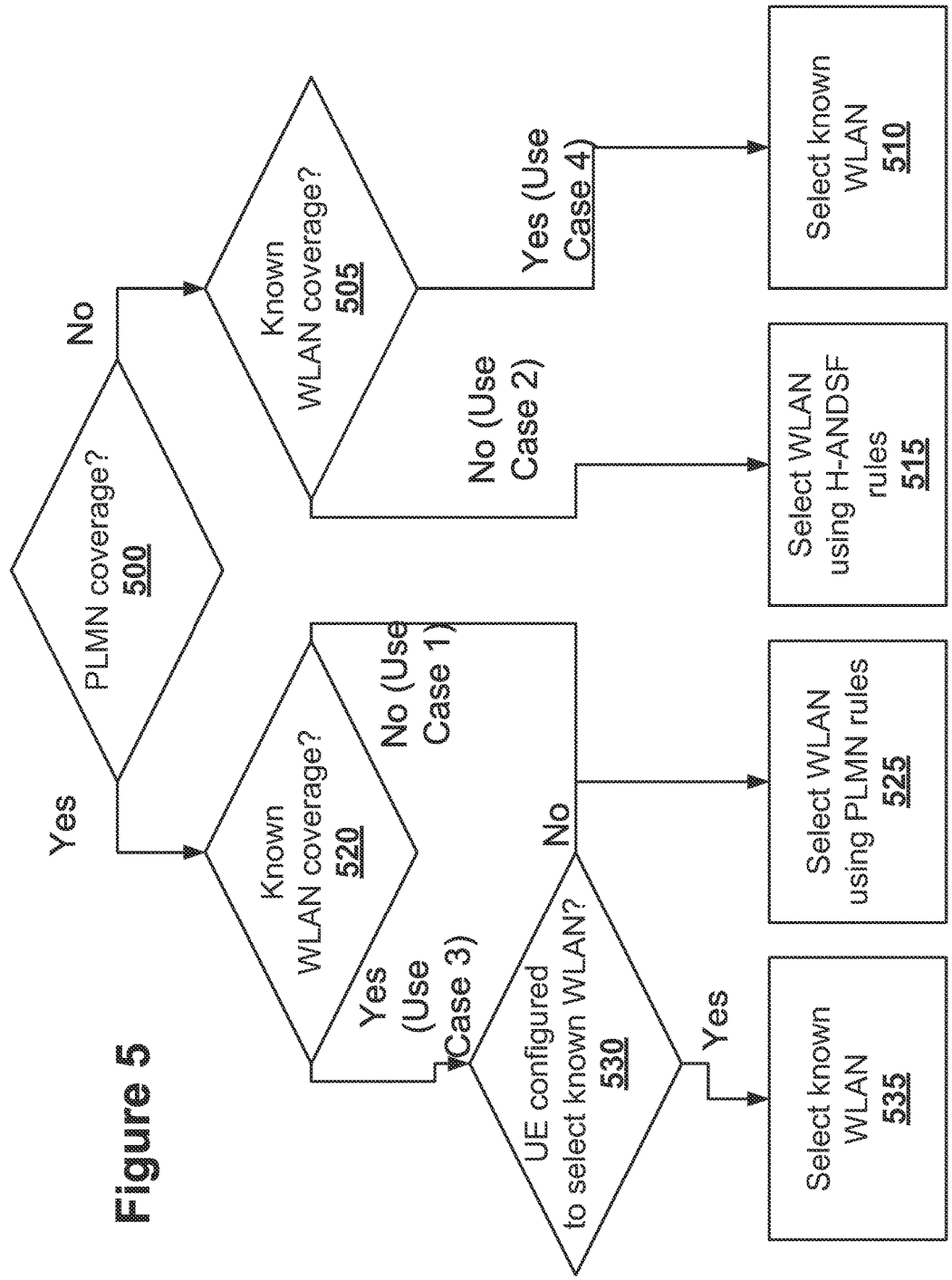
FIG. 5 depicts an example of a process that may be performed by a UE during recovery from a loss-of-signal by the UE, in accordance with various embodiments.

FIG. 5 illustrates an example process that may be used by a UE 205 to identify a default WLAN selection preference rule which the UE 205 may use to select a WLAN with which the UE 205 should connect during a loss-of-signal recovery procedure that may be performed by a UE such as UE 205. As noted above, the UE 205 may have lost a signal connection with both a PLMN and a WLAN due to a network failure, the UE 205 temporarily being in a location such as an elevator or parking garage, or some other reason. Once the UE 205 is able to connect to a WLAN and/or a PLMN, the UE 205 may initiate a loss-of-signal recovery procedure.

Initially, the UE 205 may identify at 500 whether the UE 205 is in the coverage area of a PLMN such as an HPLMN 210 or a VPLMN 225. In some embodiments the PLMN may be a last registered PLMN (RPLMN) of the UE 205. In some embodiments, the PLMN may additionally or alternatively be an equivalent PLMN (EPLMN). An EPLMN may be a PLMN that is not the same as the HPLMN 210 or the VPLMN 225, but is contracted with either the HPLMN 210 or the VPLMN 225 to provide the services of the HPLMN 210 or the VPLMN 225, respectively.

If the UE 205 is not in the coverage area of a PLMN, then the UE 205 may identify at 505 whether the UE 205 is in a coverage area of a known WLAN such as known WLAN 240.

If the UE 205 is not in the coverage area of a PLMN, and the UE 205 is in the coverage area of the known WLAN such as known WLAN 240, then the UE 205 may identify as a default WLAN selection preference rule that the UE 205 should select the known WLAN at 510 as the WLAN with which the UE 205 should connect.

If the UE 205 is not in the coverage area of a PLMN, and the UE 205 is not in the coverage area of a known WLAN, then the UE 205 may identify at 515, as a default WLAN selection preference rule, that the UE 205 should use one or more of the pre-provisioned HPLMN WLAN selection preference rules to select a WLAN with which the UE 205 should connect. Specifically, as discussed above, the UE 205 may identify as a default WLAN selection preference rule a pre-provisioned WLANSP rule, ISMP rule, or ISRP rule that the UE 205 received from an HPLMN such as HPLMN 210 before the UE 205 lost connection with the HPLMN 210.

If the UE 205 is in a coverage area of a PLMN and the UE 205 is not in the coverage area of a known WLAN, then the UE 205 may proceed to connect with the PLMN. In some embodiments the PLMN may become an RPLMN of the UE 205, which may indicate that the RPLMN is the PLMN with which the UE 205 is registered. The RPLMN may be the same as the HPLMN 210, the VPLMN 225, or some other PLMN. The UE 205 may receive one or more WLAN selection preference rules from the RPLMN. The UE 205 may then identify as a default WLAN selection preference rule one or more of the WLAN selection preference rules from the RPLMN or an EPLMN of the RPLMN. The UE 205 may use the identified default WLAN selection preference rule at 525 to identify a WLAN with which the UE 205 may connect.

If the UE 205 is in a coverage area of a PLMN and the UE 205 is in the coverage area of a known WLAN, then the UE 205 may identify at 530 whether the UE 205 is configured to connect to the known WLAN 240 at 530. If the UE 205 is configured to select the known WLAN 240, then the UE 205 may identify as a default WLAN selection preference rule that the UE 205 should select the known WLAN at 535 as the WLAN with which the UE 205 should connect.

If the UE is not configured to select the known WLAN, then the UE 205 may proceed to connect with the PLMN as described above. The UE 205 may receive one or more WLAN selection preference rules from the RPLMN. The UE 205 may then identify as a default WLAN selection preference rule one or more of the WLAN selection preference rules from the RPLMN or an EPLMN of the RPLMN. The UE 205 may use the identified default WLAN selection preference rule at 525 to identify a WLAN with which the UE 205 may connect. The UE 205 may then connect to the selected WLAN such as the known WLAN 245 or the WLAN 250 using the identified default WLAN selection preference rules discussed above.

Although not shown in FIG. 5, in some embodiments the UE 205 may identify one or more pre-provisioned HPLMN WLAN selection preference rules and identify whether to use the WLAN selection preference rule of the RPLMN (or EPLMN) at 525 or the pre-provisioned HPLMN WLAN selection preference rule. For example, the UE 205 may identify whether the RPLMN is a preferred VPLMN as described above with respect to FIG. 4. Additionally or alternatively, the UE 205 may identify whether a configuration flag of the UE 205 indicates whether to use the pre-provisioned HPLMN WLAN selection preference rule or the WLAN selection preference rule of the RPLMN (or EPLMN) as described above with respect to FIG. 3. Additionally or alternatively the UE 205 may identify relative priorities of the pre-provisioned HPLMN WLAN selection preference rule or the WLAN selection preference rule of the RPLMN (or EPLMN) or one or more additional or alternative selection criteria.

Although, as described above, the UE 205 may identify at 500 whether the UE 205 is in a coverage area of an HPLMN, VPLMN, a last RPLMN, or EPLMN, and may connect to the last RPLMN, in some embodiments the UE 205 may identify at 520 that the UE 205 is in the coverage area of a known WLAN 240. In some embodiments, the known WLAN 240 may support connectivity to the HPLMN 210, so the UE 205 may select the HPLMN 210 and may not return to the last RPLMN that the UE 205 accessed via a WLAN connection. Specifically, if the UE 205 is in a coverage area of both an RPLMN, which may be, for example, VPLMN 225, and an HPLMN 210, the UE 205 may be configured to automatically select the HPLMN 210 over the last RPLMN. The home operator, that is the operator of the HPLMN 210, may control via configuration whether a UE 205 that supports this option performs this behavior. If the HPLMN 210 cannot be found, the UE 205 may return to its last RPLMN at 500 if available.

In some embodiments, the RPLMN may be indicated to the UE 205 via an entry in an ANDSF management object (MO), for example from an ANDSF of the RPLMN. In some embodiments, the configuration option to use the HPLMN 210 or the last RPLMN may likewise be indicated by an ANDSF MO. In some embodiments, the last RPLMN information may be stored in a non-volatile memory of the UE 205, a SIM of the UE 205, or a USIM of the UE 205.

Figure 6:
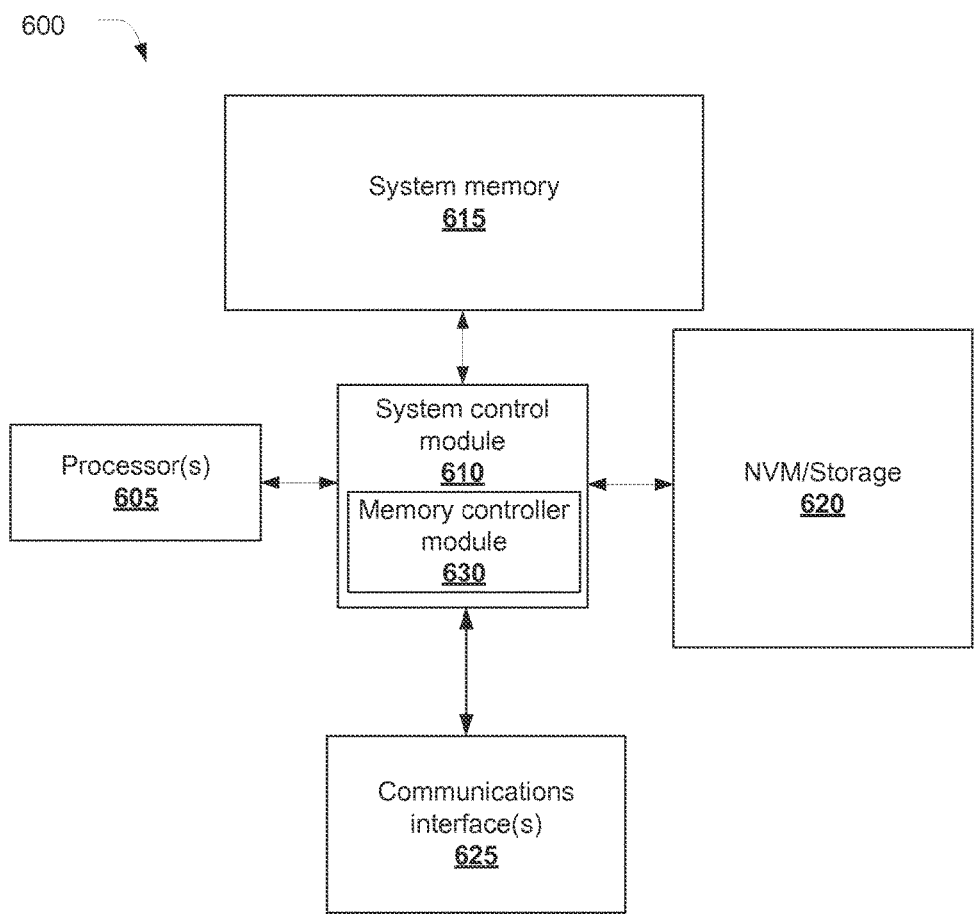
FIG. 6 schematically illustrates an example system that may be used to practice various embodiments described herein.

Embodiments of the present disclosure may be implemented into a system using any suitable hardware and/or software to configure as desired. FIG. 6 schematically illustrates an example system 600 that may be used to practice various embodiments described herein. FIG. 6 illustrates, for one embodiment, an example system 600 having one or more processor(s) 605, system control module 610 coupled to at least one of the processor(s) 605, system memory 615 coupled to system control module 610, non-volatile memory (NVM)/storage 620 coupled to system control module 610, and one or more communications interface(s) 625 coupled to system control module 610.

In some embodiments, the system 600 may be capable of functioning as the UE 110 or 205 as described herein. In other embodiments, the system 600 may be capable of functioning as the access node 105, eNBs 215 or 230, APs 245 or 255, or ANDSF 220 or 235 as described herein. In some embodiments, the system 600 may include one or more computer-readable media (e.g., system memory or NVM/storage 620) having instructions and one or more processors (e.g., processor(s) 605) coupled with the one or more computer-readable media and configured to execute the instructions to implement a module to perform actions described herein.

System control module 610 for one embodiment may include any suitable interface controllers to provide for any suitable interface to at least one of the processor(s) 605 and/or to any suitable device or component in communication with system control module 610.

System control module 610 may include memory controller module 630 to provide an interface to system memory 615. The memory controller module 630 may be a hardware module, a software module, and/or a firmware module.

System memory 615 may be used to load and store data and/or instructions, for example, for system 600. System memory 615 for one embodiment may include any suitable volatile memory, such as suitable DRAM, for example. In some embodiments, the system memory 615 may include double data rate type four synchronous dynamic random-access memory (DDR4 SDRAM).

System control module 610 for one embodiment may include one or more input/output (I/O) controller(s) to provide an interface to NVM/storage 620 and communications interface(s) 625.

The NVM/storage 620 may be used to store data and/or instructions, for example. NVM/storage 620 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. In some embodiments, NVM/storage 620 may be coupled with the communication module 120, and the communication module 120 may be configured to store data such as a received WLAN selection preference rule in the NVM/storage 620.

The NVM/storage 620 may include a storage resource physically part of a device on which the system 600 may be installed or it may be accessible by, but not necessarily a part of, the device. For example, the NVM/storage 620 may be accessed over a network via the communications interface(s) 625.

Communications interface(s) 625 may provide an interface for system 600 to communicate over one or more network(s) and/or with any other suitable device. The system 600 may wirelessly communicate with the one or more components of the wireless network in accordance with any of one or more wireless network standards and/or protocols. In some embodiments the communications interface(s) 625 may include the transceiver modules 122 or 135.

For one embodiment, at least one of the processor(s) 605 may be packaged together with logic for one or more controller(s) of system control module 610, e.g., memory controller module 630. For one embodiment, at least one of the processor(s) 605 may be packaged together with logic for one or more controllers of system control module 610 to form a System in Package (SiP). For one embodiment, at least one of the processor(s) 605 may be integrated on the same die with logic for one or more controller(s) of system control module 610. For one embodiment, at least one of the processor(s) 605 may be integrated on the same die with logic for one or more controller(s) of system control module 610 to form a System on Chip (SoC).

In some embodiments the processor(s) 605 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or GPS circuitry (not shown).

In various embodiments, the system 600 may be, but is not limited to, a server, a workstation, a desktop computing device, or a mobile computing device (e.g., a laptop computing device, a handheld computing device, a tablet, a netbook, a smart phone, a gaming console, etc.). In various embodiments, the system 600 may have more or less components, and/or different architectures. For example, in some embodiments, the system 600 includes one or more of a camera, a keyboard, liquid crystal display (LCD) screen (including touch screen displays), non-volatile memory port, multiple antennas, graphics chip, application-specific integrated circuit (ASIC), and speakers.

EXAMPLES

Example 1 may include an apparatus to be employed in a user equipment (UE), the apparatus comprising: a communication module to: receive a wireless local area network (WLAN) selection preference rule from a home public land mobile network (HPLMN); and store the WLAN selection preference rule in a non-transitory storage medium; and a WLAN selection module to select, during a power-up procedure of the UE and prior to an association of the UE with a public land mobile network (PLMN), a WLAN based at least in part on the WLAN selection preference rule.

Example 2 may include the apparatus of example 1, wherein the WLAN selection preference rule is a WLAN selection policy (WLANSP) rule of the HPLMN.

Example 3 may include the apparatus of example 2, wherein the WLAN selection module is to select the WLAN based at least in part on an indication of priority of the WLANSP rule.

Example 4 may include the apparatus of example 1, wherein the communication module is to receive the WLAN selection preference rule from an access network discovery and selection function (ANDSF) of the HPLMN.

Example 5 may include the apparatus of any of examples 1-4, wherein the communication module is further to receive an inter-system mobility policy (ISMP) rule or inter-system routing policy (ISRP) rule from a visited PLMN (VPLMN) during the power-up procedure of the UE.

Example 6 may include the apparatus of example 5, wherein: the WLAN selection module is to select the WLAN based on the WLAN selection preference rule if a configuration flag provides an indication to use the WLAN selection preference rule; and wherein the WLAN selection module is to select the WLAN based on the ISMP rule of the VPLMN or the ISRP rule of the VPLMN if the configuration flag does not provide an indication to use the WLAN selection preference rule.

Example 7 may include the apparatus of example 5, wherein: the WLAN selection module is to select the WLAN based on the ISMP rule of the VPLMN or the ISRP rule of the VPLMN if the VPLMN is a preferred VPLMN; and the WLAN selection module is to select the WLAN based on the WLAN selection preference rule if the VPLMN is not a preferred VPLMN.

Example 8 may include the apparatus of any of examples 1-4, wherein the communication module is a baseband module and the apparatus further comprises a multi-mode transceiver chip that includes the baseband module, the WLAN selection module, and a power management unit to control power provided to the baseband and WLAN selection modules.

Example 9 may include a method comprising: accessing, during a re-association procedure of a user equipment, a wireless local area network (WLAN) selection preference rule with which the UE is originally provisioned by a home public land mobile network (HPLMN) of the UE; selecting, during the re-association procedure of the UE, a WLAN based at least in part on the WLAN selection preference rule; and associating, by the UE, with the selected WLAN.

Example 10 may include the method of example 9, wherein the re-association procedure is a power-up procedure.

Example 11 may include the method of example 9, wherein the WLAN selection preference rule is a WLAN selection policy (WLANSP) rule, an inter-system mobility policy (ISMP) rule, or an inter-system routing policy (ISRP) rule of the HPLMN.

Example 12 may include the method of example 11, further comprising selecting the WLAN based at least in part on an indication of a priority of the WLANSP rule, the ISMP rule, or the ISRP rule of the HPLMN.

Example 13 may include the method of example 9, wherein the WLAN selection preference rule is a WLAN selection preference rule of an access network discovery and selection function (ANDSF) of the HPLMN.

Example 14 may include the method of any of examples 9-12, further comprising receiving, by the UE during the power-up procedure, a WLAN selection policy (WLANSP) rule, an inter-system mobility policy (ISMP) rule, or an inter-system routing policy (ISRP) rule of a visited PLMN (VPLMN).

Example 15 may include the method of example 14, further comprising: selecting, by the UE, the WLAN based on the WLAN selection preference rule if a configuration flag indicates to use the WLAN selection preference rule; and selecting, by the UE, the WLAN based on the WLANSP rule, the ISMP rule, or the ISRP rule of the VPLMN if the configuration flag indicates to not use the WLAN selection preference rule.

Example 16 may include the method of example 14, further comprising: selecting, by the UE, the WLAN based on the WLAN selection preference rule if the VPLMN is not a preferred VPLMN of the UE; and selecting, by the UE, the WLAN based on the WLANSP rule, the ISMP rule, or the ISRP rule of the VPLMN if the VPLMN is a preferred VPLMN.

Example 17 may include one or more non-transitory computer readable media comprising instructions configured to cause a user equipment (UE), upon execution of the instructions by the UE, to: identify availability of a public land mobile network (PLMN) during a loss-of-signal recovery procedure of the UE; identify availability of a known wireless local area network (WLAN) of the UE during the loss-of-signal recovery procedure of the UE; identify, based at least in part on the availability of the PLMN and the availability of the WLAN, a default WLAN selection preference rule of the UE; select a WLAN based at least in part on the default WLAN selection preference rule; and associate with the WLAN.

Example 18 may include the one or more non-transitory computer readable media of example 17, wherein the default WLAN selection preference rule is to select the known WLAN if a PLMN is not available and the known WLAN is available.

Example 19 may include the one or more non-transitory computer readable media of example 17, wherein the default WLAN selection preference rule is to select the WLAN based on a WLAN selection preference rule of a home PLMN (HPLMN) of the UE if the PLMN is not available and the known WLAN is not available.

Example 20 may include the one or more non-transitory computer readable media of example 19, wherein the WLAN selection preference rule of the home PLMN is a WLAN selection policy (WLANSP) rule, an inter-system mobility policy (ISMP) rule, or an inter-system routing policy (ISRP) rule of an access network discovery and selection function (ANDSF) of the HPLMN.

Example 21 may include the one or more non-transitory computer readable media of example 17, wherein the default WLAN selection preference rule is, if the PLMN is available and the known WLAN is not available, to: associate with the PLMN; receive a WLAN selection policy (WLANSP) rule, an inter-system mobility policy (ISMP) rule, or an inter-system routing policy (ISRP) rule from the PLMN; and select the WLAN based on the WLANSP rule, the ISMP rule, or the ISRP rule.

Example 22 may include the one or more non-transitory computer readable media of example 17, wherein the default WLAN selection preference rule is, if the PLMN is available and the known WLAN is available, to: identify whether the UE is configured to associate with the known WLAN; select the known WLAN if the UE is configured to associate with the known WLAN; and if the UE is configured to not associate with the known WLAN, then: associate with the PLMN; receive a WLAN selection policy (WLANSP) rule, an inter-system mobility policy (ISMP) rule, or an inter-system routing policy (ISRP) rule from the PLMN; and select the WLAN based on the WLANSP rule, the ISMP rule, or the ISRP rule.

Example 23 may include an apparatus comprising: means to identify availability of a public land mobile network (PLMN) during a loss-of-signal recovery procedure of the UE; means to identify availability of a known wireless local area network (WLAN) of the UE during the loss-of-signal recovery procedure of the UE; means to identify, based at least in part on the availability of the PLMN and the availability of the WLAN, a default WLAN selection preference rule of the UE; means to select a WLAN based at least in part on the default WLAN selection preference rule; and means to associate with the WLAN.

Example 24 may include the apparatus of example 23, wherein the default WLAN selection preference rule is to select the known WLAN if a PLMN is not available and the known WLAN is available.

Example 25 may include the apparatus of example 23, wherein the default WLAN selection preference rule is to select the WLAN based on a WLAN selection preference rule of a home PLMN (HPLMN) of the UE if the PLMN is not available and the known WLAN is not available.

Example 26 may include the apparatus of example 25, wherein the WLAN selection preference rule of the home PLMN is a WLAN selection policy (WLANSP) rule, an inter-system mobility policy (ISMP) rule, or an inter-system routing policy (ISRP) rule of an access network discovery and selection function (ANDSF) of the HPLMN.

Example 27 may include the apparatus of example 23, wherein the default WLAN selection preference rule is, if the PLMN is available and the known WLAN is not available, to: associate with the PLMN; receive a WLAN selection policy (WLANSP) rule, an inter-system mobility policy (ISMP) rule, or an inter-system routing policy (ISRP) rule from the PLMN; and select the WLAN based on the WLANSP rule, the ISMP rule, or the ISRP rule.

Example 28 may include the apparatus of example 23, wherein the default WLAN selection preference rule is, if the PLMN is available and the known WLAN is available, to: identify whether the UE is configured to associate with the known WLAN; select the known WLAN if the UE is configured to associate with the known WLAN; and if the UE is configured to not associate with the known WLAN, then: associate with the PLMN; receive a WLAN selection policy (WLANSP) rule, an inter-system mobility policy (ISMP) rule, or an inter-system routing policy (ISRP) rule from the PLMN; and select the WLAN based on the WLANSP rule, the ISMP rule, or the ISRP rule.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:
1. An apparatus comprising:
a communication module to:
receive a wireless local area network (WLAN) selection preference rule from a public land mobile network (PLMN);
store the WLAN selection preference rule in a non-transitory storage medium; and
receive an inter-system mobility policy (ISMP) rule or inter-system routing policy (ISRP) rule from a visited PLMN (VPLMN) during power-up; and
a WLAN selection module to:
select a WLAN based on the WLAN selection preference rule, during power-up, while the apparatus has not registered to any PLMN;
select the WLAN based on the WLAN selection preference rule if the VPLMN is not a preferred VPLMN; and
select the WLAN based on the ISMP rule of the VPLMN or the ISRP rule of the VPLMN if the VPLMN is a preferred VPLMN.
2. The apparatus of claim 1, wherein the WLAN selection preference rule is a WLAN selection policy (WLANSP) rule of the PLMN.
3. The apparatus of claim 2, wherein the WLAN selection module is to select the WLAN based on an indication of priority of the WLANSP rule.

4. The apparatus of claim 1, wherein the communication module is to receive the WLAN selection preference rule from an access network discovery and selection function (ANDSF) of the PLMN.

5. The apparatus of claim 1, wherein the communication module is a baseband module and the apparatus further comprises a multi-mode transceiver chip that includes the baseband module, the WLAN selection module, and a power management unit to control power provided to the baseband and WLAN selection modules.

6. One or more non-transitory computer readable media comprising instructions configured to cause a user equipment (UE), upon execution of the instructions by the UE, to:
receive a wireless local area network (WLAN) selection preference rule from a public land mobile network (PLMN);
store the WLAN selection preference rule in a non-transitory storage medium;
receive an inter-system mobility policy (ISMP) rule or inter-system routing policy (ISRP) rule from a visited PLMN (VPLMN) during power-up;
select a WLAN based on the WLAN selection preference rule, during power-up, while the apparatus has not registered to any PLMN;
select the WLAN based on the WLAN selection preference rule if the VPLMN is not a preferred VPLMN; and
select the WLAN based on the ISMP rule of the VPLMN or the ISRP rule of the VPLMN if the VPLMN is a preferred VPLMN.

7. The one or more non-transitory computer readable media of claim 6, wherein the WLAN selection preference rule is a WLAN selection policy (WLANSP) rule of the PLMN.

8. The one or more non-transitory computer readable media of claim 7, wherein a WLAN selection module is to select the WLAN based on an indication of priority of the WLANSP rule.

9. The one or more non-transitory computer readable media of claim 6, wherein a communication module is to receive the WLAN selection preference rule from an access network discovery and selection function (ANDSF) of the PLMN.

10. An apparatus comprising:
a communication module to:
receive a wireless local area network (WLAN) selection preference rule from a public land mobile network (PLMN);
store the WLAN selection preference rule in a non-transitory storage medium; and
receive an inter-system mobility policy (ISMP) rule or inter-system routing policy (ISRP) rule from a visited PLMN (VPLMN) during power-up; and
a WLAN selection module to:
select a WLAN based on the WLAN selection preference rule, during power-up, while the apparatus has not registered to any PLMN;
select the WLAN based on the WLAN selection preference rule if a configuration flag provides an indication to use the WLAN selection preference rule; and
select the WLAN based on the ISMP rule of the VPLMN or the ISRP rule of the VPLMN if the configuration flag does not provide an indication to use the WLAN selection preference rule.

11. One or more non-transitory computer readable media comprising instructions configured to cause a user equipment (UE), upon execution of the instructions by the UE, to:
receive a wireless local area network (WLAN) selection preference rule from a public land mobile network (PLMN);
store the WLAN selection preference rule in a non-transitory storage medium;
receive an inter-system mobility policy (ISMP) rule or inter-system routing policy (ISRP) rule from a visited PLMN (VPLMN) during power-up;
select a WLAN based on the WLAN selection preference rule, during power-up, while the apparatus has not registered to any PLMN;
select the WLAN based on the WLAN selection preference rule if a configuration flag provides an indication to use the WLAN selection preference rule; and
select the WLAN based on the ISMP rule of the VPLMN or the ISRP rule of the VPLMN if the configuration flag does not provide an indication to use the WLAN selection preference rule.

* * * * *